(12) United States Patent
Lourit et al.

(10) Patent No.: US 10,494,997 B2
(45) Date of Patent: Dec. 3, 2019

(54) DEVICE FOR DE-ICING A SPLITTER NOSE OF AN AVIATION TURBINE ENGINE

(71) Applicant: SAFRAN AIRCRAFT ENGINES, Paris (FR)

(72) Inventors: Damien Daniel Sylvain Lourit, Lieusaint (FR); François Marie Paul Marlin, Villiers sous Rez (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 214 days.

(21) Appl. No.: 15/590,474

(22) Filed: May 9, 2017

(65) Prior Publication Data
US 2017/0321604 A1 Nov. 9, 2017

(30) Foreign Application Priority Data
May 9, 2016 (FR) ...................................... 16 54126

(51) Int. Cl.
*F02C 7/04* (2006.01)
*F02C 7/047* (2006.01)
(Continued)

(52) U.S. Cl.
CPC .............. *F02C 7/047* (2013.01); *B64D 15/04* (2013.01); *F02K 3/06* (2013.01); *B64D 15/02* (2013.01); *B64D 33/02* (2013.01); *B64D 2033/0233* (2013.01); *F01D 25/02* (2013.01); *F02C 7/04* (2013.01); *F05D 2220/30* (2013.01); *F05D 2220/323* (2013.01); *F05D 2240/12* (2013.01); *F05D 2300/211* (2013.01)

(58) Field of Classification Search
CPC . F02C 7/047; F02C 7/08; B64D 15/04; B64D 15/02; F02K 3/06
See application file for complete search history.

(56) References Cited

U.S. PATENT DOCUMENTS

| 4,860,534 A | 8/1989 | Easley et al. |
| 8,205,426 B2* | 6/2012 | Schilling ................. F01D 25/14 |
| | | 244/134 R |
| 2003/0035719 A1* | 2/2003 | Wadia ..................... F01D 25/02 |
| | | 415/145 |

FOREIGN PATENT DOCUMENTS

| EP | 1 895 141 A2 | 3/2008 |
| EP | 2 505 789 A1 | 10/2012 |
| EP | 2 821 597 A1 | 1/2015 |

OTHER PUBLICATIONS

Preliminary Search Report as issued in French Patent Application No. 1654126, dated Jan. 16, 2017.

* cited by examiner

*Primary Examiner* — Kevin A Lathers
(74) *Attorney, Agent, or Firm* — Pillsbury Winthrop Shaw Pittman LLP

(57) ABSTRACT

A device for de-icing a splitter nose of an aviation turbine engine, the device including a splitter nose having an outer annular wall defining the inside of the bypass stream flow channel and an inner annular wall defining an inlet of the core stream flow channel, and an inner shroud mounted at its upstream end on the inner annular wall of the splitter nose and designed to have inlet guide vanes fastened thereto, the splitter nose and the inner shroud defining an annular volume. The device includes an annular deflector positioned inside the annular volume so as to subdivide the annular volume into a first annular cavity and a second annular cavity, the second annular cavity being defined between the annular deflector and the outer annular wall of the splitter nose.

10 Claims, 2 Drawing Sheets

(51) Int. Cl.
*B64D 15/04* (2006.01)
*F02K 3/06* (2006.01)
*B64D 15/02* (2006.01)
*B64D 33/02* (2006.01)
*F01D 25/02* (2006.01)

DEVICE FOR DE-ICING A SPLITTER NOSE OF AN AVIATION TURBINE ENGINE

CROSS-REFERENCE TO RELATED APPLICATIONS

This application claims priority to French Patent Application No. 1654126, filed May 9, 2016, the entire content of which is incorporated herein by reference in its entirety.

FIELD

The present invention relates to the general field of turbine engines. The invention relates more particularly to a system for de-icing a splitter nose of an aviation turbine engine.

BACKGROUND

In an aviation turbine engine of the two-spool bypass type, the flow channels for the core stream and for the bypass stream are split downstream from the fan by a splitter nose. Within the core stream, at the inlet to the low pressure compressor (also known as a "booster"), there is a set of stationary inlet guide vanes (IGVs).

During certain stages of flight, and on the ground, the turbine engine may encounter icing atmospheric conditions, in particular when ambient temperature is sufficiently low and in the presence of high humidity. Under such conditions, ice can form on the splitter nose and on the IGVs. When this phenomenon occurs, it can lead to the core stream flow channel being partially or completely obstructed, and to detached blocks of ice being ingested in the core stream. Obstruction in the core stream flow channel leads to the combustion chamber receiving too little air, which can then cause the engine to shut down or to fail to accelerate. In the event of blocks of ice becoming detached, they can damage the compressor situated downstream, and can likewise lead to the combustion chamber shutting down.

In order to avoid ice forming on the splitter nose, known techniques consist in taking hot air from the core stream flow channel at a compressor and injecting it into the inside of the splitter nose. The hot air injected into the splitter nose can then travel along the nose to holes or grooves that are configured to inject the hot air into the core stream flow channel which can also de-ice the IGVs.

The flow rate of hot air needed to de-ice the splitter nose is considerable. Taking off hot air in this way can reduce the performance and the operability of the engine. It would therefore be desirable to be able to increase the effectiveness of the de-icing of the splitter nose without correspondingly increasing the amount of hot air that is taken from a pressurized portion of the engine.

SUMMARY

An aspect of the present invention thus is directed to increasing the effectiveness with which the splitter nose is de-iced by proposing a de-icer device for de-icing a splitter nose of an aviation turbine engine, the device comprising:
- a splitter nose for positioning downstream from a fan of the engine in order to split air from the fan into a core stream and a bypass stream in respective annular flow channels, the nose having an outer annular wall defining the inside of the bypass stream flow channel and an inner annular wall defining an inlet of the core stream flow channel;
- an inner shroud mounted at its upstream end on the inner annular wall of the splitter nose and designed to have inlet guide vanes fastened thereto, the splitter nose and the inner shroud defining an annular volume; and
- a plurality of injection orifices configured to inject hot air into the core stream flow channel towards the inlet guide vanes.

In accordance with an embodiment of the invention, the de-icer device further comprises an annular deflector positioned inside the annular volume subdividing the annular volume into a first annular cavity and a second annular cavity, which second annular cavity is defined between the annular deflector and the outer annular wall of the splitter nose, the deflector having an upstream end in contact with the outer annular wall of the splitter nose; and
  at least one nozzle opening out to the inside of the first annular cavity, the nozzle being fed with hot air by a feed duct connected to a pressurized portion of the engine.

In the present disclosure, the terms "upstream" and "downstream" are defined relative to the flow direction of air through the engine; the terms "inner" and "outer", "axial" and "radial", and their derivatives, are defined relative to the longitudinal axis of the engine.

A de-icer device of an embodiment of the invention serves to increase the effectiveness with which the splitter nose is de-iced, in particular by reducing losses of heat from the inside of the annular volume defined in the splitter nose. Specifically, the presence of the annular deflector serves to cause the de-icing hot air to flow inside the nose in a first cavity of volume that is smaller than the total annular volume defined by the splitter nose and the inner shroud. By reducing this volume, the hot air is channeled and concentrated towards the zones of interest for de-icing, namely the end of the splitter nose and the inner shroud. Since there is no point in de-icing the outer annular wall of the splitter nose, heat losses through this wall are minimized, with hot air no longer flowing directly in the proximity of the outer annular wall. The effectiveness of de-icing is thus increased without modifying the flow rate at which de-icing hot air is taken from the engine.

In an embodiment, the deflector is configured so that the hot air flows inside the first cavity. The nozzle may open out into the first cavity. By way of example, hot air is taken from the high pressure compressor of the engine. The deflector may present at least one hump in which the nozzle is received.

In an embodiment, the deflector includes at least one elastically deformable tab bearing against the inner shroud and exerting a force on an upstream end of the deflector in contact with the outer annular wall of the splitter nose. The presence of this tab serves to provide sealing between the deflector and the outer annular wall at the upstream end, and to provide the assembly with good mechanical behavior in operation, in particular by ensuring that the deflector is held in position inside the annular volume. By way of example, an elastically deformable tab may be made of metal, and it may be fastened to the annular deflector by means of rivets. The annular deflector may have a plurality of elastically deformable tabs distributed all around its circumference. Naturally, means other than the elastically deformable tab could be used for putting the outer annular wall of the splitter nose into contact with the upstream end of the deflector, e.g. spring elements.

Also in an embodiment, the deflector is fastened downstream by a fastener system to a flange extending from the outer annular wall of the splitter nose. Such a fastener system may for example comprise rivets.

Also in an embodiment, the deflector is coated in a thermally insulating layer. The thermally insulating layer may comprise a material selected from: a material comprising room temperature vulcanizing (RTV) silicone, e.g. of the Dapco™ 2100 type; and lagging based on compressed silica powder. A thermally insulating layer serves to further minimize heat losses by reducing heat transfer between the first cavity and the second cavity.

In an embodiment, the inner shroud has injection orifices configured to inject hot air into the core stream annular flow channel towards the inlet guide vanes.

In an embodiment, a groove is provided between the inner shroud and the splitter nose so that hot air can flow close to an end of the splitter nose and be injected into the core stream annular flow channel in order to de-ice the inlet guide vanes. In an embodiment, to facilitate assembly, the deflector may be subdivided into a plurality of deflector sectors that are distributed circumferentially inside the annular volume. For example, the annular deflector may be subdivided into six angular deflector sectors.

In an embodiment, the inner shroud is provided with injection orifices, or the injection orifices are grooves provided between the inner shroud and the splitter nose.

An aspect of the invention also provides an aviation turbine engine fan module comprising: a fan, a low pressure compressor, inlet guide vanes situated upstream from the low pressure compressor and downstream from the fan, and a de-icer device as set out above.

Finally, an aspect of the invention provides an aviation turbine engine including a fan module as set out above.

BRIEF DESCRIPTION OF THE DRAWINGS

Other characteristics and benefits of the present invention appear from the following description given with reference to the accompanying drawings, which show an embodiment having no limiting character. In the figures.

DETAILED DESCRIPTION

Figure 1:
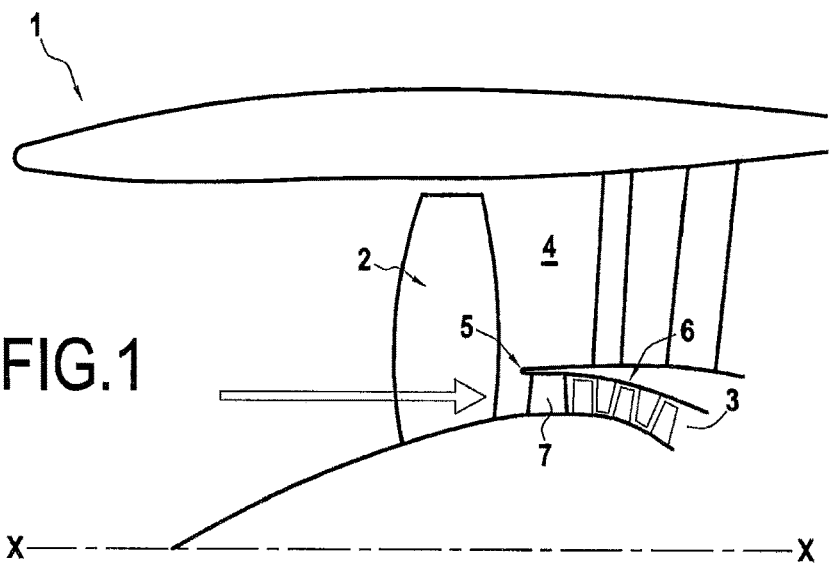
FIG. 1 is a fragmentary longitudinal section view of an aviation turbine engine having a de-icer device of an embodiment of the invention.

FIG. 1 is a fragmentary view of an aviation turbine engine 1 of the two-spool bypass type to which the invention may be applied. In known manner, the engine 1 is axially symmetrical about a longitudinal axis X-X and includes an inlet at its upstream end that receives outside air, this air being fed to a fan 2. Downstream from the fan 2, the air is split between a flow channel 3 for a core stream (or hot stream) and a flow channel 4 for a bypass stream (or cold stream). These two channels 3 and 4 are separated from each other by a splitter nose 5. Once air has entered into the core stream flow channel 3, it then passes through a low pressure compressor 6 (or "booster"), a high pressure compressor, a combustion chamber, and turbines (these elements not being shown in the figures), prior to being ejected to the outside of the engine. Inlet guide vanes 7 are present upstream from the low pressure compressor 6 at the inlet to the core stream flow channel 3.

Figure 2:
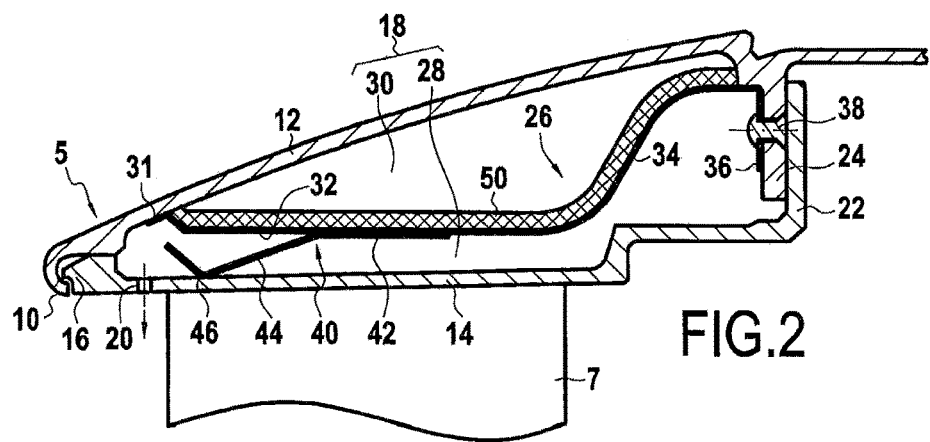
FIG. 2 is a first section view of a de-icer device of an embodiment of the invention.
Figure 5:
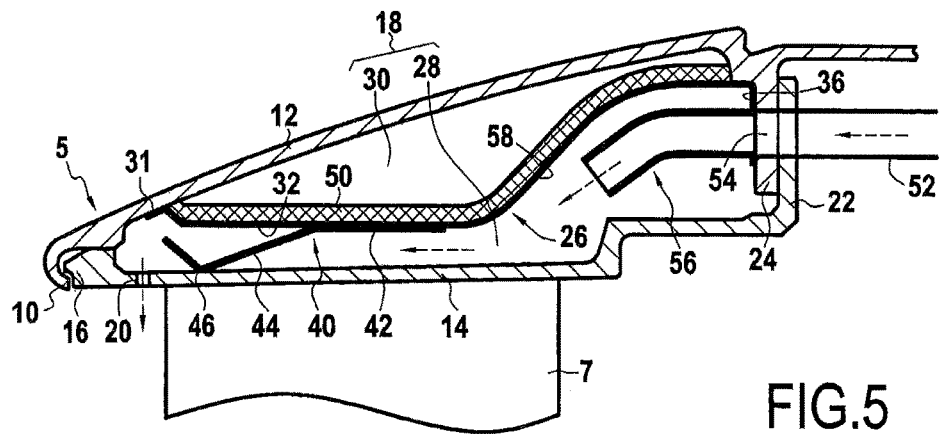
FIG. 5 is a second section view of the de-icer device.

As shown in FIGS. 2 and 5, the splitter nose 5 presents a longitudinal section that is of a rounded V- or U-shape at its upstream end. The nose 5 comprises an inner annular wall 10 defining the inlet to the core stream flow channel 3, and an outer annular wall 12 radially defining the inside of the bypass stream flow channel 4. The outer annular wall 12 is of greater size in the longitudinal direction than the inner annular wall 10.

The inner annular wall 10 of the splitter nose 5 is extended downstream by an inner shroud 14 that carries the inlet guide vanes 7. The inner shroud 14 presents a hook 16 at an upstream end that enables it to rest on the inner annular wall 10 of the splitter nose 5 while being blocked by the wall 10 at the upstream end. A passage, e.g. a groove, may be provided between the hook 16 and the splitter nose 5 in order to enable hot air to de-ice the end of the splitter nose 5 and the inlet guide vanes 7. In the example shown, the inner shroud 14 presents a radial flange 22 at its downstream end that bears against a flange 24 extending radially from the outer annular wall 12 of the splitter nose 5 at its downstream end. In the example shown, the inner shroud 14 may be pierced by injection orifices 20 situated downstream from the hook 16 and distributed circumferentially all around the inner shroud 14. The injection orifices 20 may be configured so that, in operation, hot air is injected into the core stream flow channel 3 towards the leading edges of the inlet guide vanes 7 in order to de-ice them. The inner and outer annular walls 10 and 12, and the inner shroud 14 together define an annular volume 18 in the splitter nose 5.

In an embodiment of the invention, an annular deflector 26 is positioned inside the above-defined annular volume 18 (FIGS. 2 and 5). The deflector 26 is in the form of a ring that separates the annular volume 18 into a first cavity 28 in which hot air flows, and into which the injection orifices 20, if any, open out, and a second cavity 30 that is radially defined on the outside by the outer annular wall 12 of the splitter nose. The first cavity 28 is thus defined between the inner shroud 14 and the deflector 26, and more precisely between the inner shroud 14, the upstream end of the splitter nose 5, a portion of the outer annular wall 12, and the deflector 26. The above-defined annular volume 18 corresponds to the first and second cavities 28 and 30 taken together. From upstream to downstream, the deflector 26 comprises: an end 31 in contact with the outer annular wall 12; a portion 32 of substantially rectilinear longitudinal section; a portion 34 where the diameter of the deflector 26 increases progressively on going downstream in order to accommodate any increase in the diameter of the inner shroud 14; and a flange 36 extending in a radial direction and situated at the downstream end of the deflector 26. In the example shown, the flange 36 of the deflector 26 is fastened downstream to the flange 24 of the outer annular wall 12 by means of rivets 38.

In the example shown in FIGS. 2 and 5, the deflector 26 may be covered in a thermally insulating layer 50. This layer 50 serves to further reduce the transfer of heat between the first cavity 28 and the second cavity 30 via the deflector 26. By way of example, this layer 50 may comprise a material selected from: a material comprising room temperature vulcanizing (RTV) silicone, e.g. of the Dapco™ 2100 type; and lagging based on compressed silica powder.

It shroud be observed that the deflector 26 may be subdivided into a plurality of angular deflector sectors e.g.

six deflector sectors, which may be distributed circumferentially in the annular volume 18. An example of an angular deflector sector is shown in greater detail in FIG. 3.

An elastically deformable tab 40 is present on the deflector 26 and serves to hold it in position in the annular volume 18. In the example shown, the tab 40 is generally in the shape of a spatula. More precisely, the tab 40 comprises a first portion 42 that is fastened to the wall of the deflector 26 facing the inner shroud 14, e.g. using rivets 48 (FIG. 3) or welding, and a second portion 44 having a bend 46 via which the tab 40 rests against the inner shroud 14. The tab 40 serves to exert a force on the end 31 of the deflector 26, which force is directed radially outwards in order to hold the end 31 permanently in contact with the outer annular wall 12. It may be observed that a plurality of tabs 40 may be provided around the circumference of the deflector 26 in order to hold it against the outer annular wall 12. The tabs 40 thus serve to minimize or even prevent hot air passing between the first cavity 28 and the second cavity 30 at the upstream end, while contact between the flange 36 of the deflector 26 and the flange 24 of the outer annular wall 12 minimizes or prevents hot air from passing between the two cavities 28 and 30 at the downstream end. By way of example, an elastically deformable tab 40 may be made of metal material.

Figure 4:
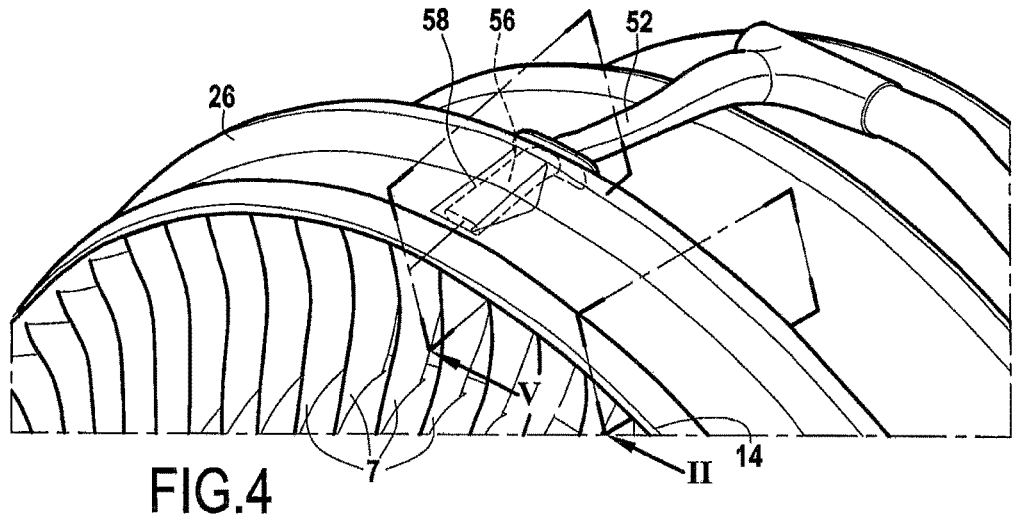
FIG. 4 is a perspective view showing the positioning of the deflector in the splitter nose.
Figure 6:
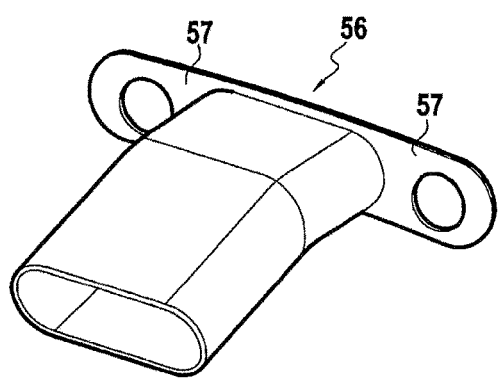
FIG. 6 is a perspective view of a nozzle suitable for use in a de-icer device of an embodiment of the invention.

FIG. 4 shows the positioning of the deflector 26 inside the annular volume 18. It should be observed that the splitter nose 5 is not shown in this figure. In order to feed the first cavity 28 with hot air, it is possible to provide a feed duct 52. By way of example, this feed duct 52 may be connected to a pressurized portion of the engine, such as a high pressure compressor, and it may open out into the first cavity 28 via an opening 54 provided in the flanges 22, 24, and 36. A nozzle 56 connected to the feed duct 52 may be provided in the first cavity 28 in order to inject the hot air upstream into the splitter nose 5. A nozzle 56 may be provided with pierced tongues 57 (FIG. 6) to enable the nozzle to be fastened, e.g. using rivets (not shown). In FIGS. 2 and 5, dashed-line arrows represent the path followed by the hot air.

Figure 3:
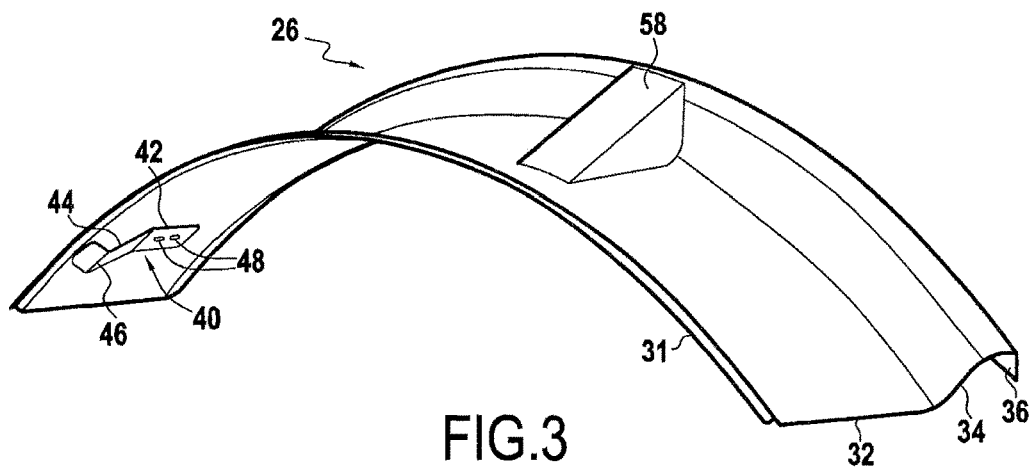
FIG. 3 is a perspective view of a deflector present in a de-icer device of an embodiment of the invention.

In the example shown in FIGS. 3 to 5, in order to accommodate the presence of the nozzle 56, the deflector 26 may be provided with a hump 58 in which the nozzle 56 is received. It may be observed that a plurality of nozzles 56 may be distributed around the circumference of the annular volume 18 of the splitter nose 5, e.g. ten nozzles.

In order to assemble the de-icer device of the invention, comprising in particular the splitter nose 5, the inner shroud 14, and the annular deflector 26, the annular deflector 26 is initially attached to the flange 24, followed by the inner shroud 14. When they are used, the nozzles 56 may be mounted in the device before assembling the inner shroud 14.

The invention claimed is:

1. A de-icer device for de-icing a splitter nose of an aviation turbine engine, the device comprising:
    a splitter nose for positioning downstream from a fan of the engine in order to split air from the fan into a core stream and a bypass stream in respective annular flow channels, said splitter nose having an outer annular wall defining the inside of the bypass stream flow channel and an inner annular wall defining an inlet of the core stream flow channel;
    an inner shroud mounted at its upstream end on the inner annular wall of the splitter nose and designed to have inlet guide vanes fastened thereto, the splitter nose and the inner shroud defining an annular volume;
    a plurality of injection orifices configured to inject hot air into the core stream flow channel towards the inlet guide vanes;
    an annular deflector positioned inside the annular volume subdividing said annular volume into a first annular cavity and a second annular cavity, which second annular cavity is defined between the annular deflector and the outer annular wall of the splitter nose, the deflector having an upstream end in contact with the outer annular wall of the splitter nose in order to prevent hot air from flowing between the first annular cavity and the second annular cavity; and
    at least one nozzle opening out to the inside of the first annular cavity, said nozzle being fed with hot air by a feed duct connected to a pressurized portion of the engine.

2. The device according to claim 1, wherein the annular deflector includes at least one elastically deformable tab bearing against the inner shroud and exerting a force on the upstream end of the deflector in contact with the outer annular wall of the splitter nose.

3. The device according to claim 1, wherein the annular deflector is fastened downstream by a fastener system to a flange extending from the outer annular wall of the splitter nose.

4. The device according to claim 1, wherein the annular deflector is coated in a thermally insulating layer.

5. The device according to claim 4, wherein said thermally insulating layer comprises a material selected from: a material comprising RTV silicone; and lagging based on compressed silica powder.

6. The device according to claim 1, wherein the annular deflector is subdivided into a plurality of deflector sectors that are distributed circumferentially inside the annular volume.

7. The device according to claim 1, wherein the annular deflector presents at least one hump in which the nozzle is received.

8. The device according to claim 1, wherein the inner shroud is provided with the plurality of injection orifices, or the plurality of injection orifices are grooves provided between the inner shroud and the splitter nose.

9. An aviation turbine engine fan module comprising: a fan, a low pressure compressor, inlet guide vanes situated upstream from the low pressure compressor and downstream from the fan, and a de-icer device according to claim 1.

10. The aviation turbine engine including a fan module according to claim 9.

* * * * *